United States Patent
Stewart et al.

(10) Patent No.: US 7,620,317 B2
(45) Date of Patent: Nov. 17, 2009

(54) PROGRAMMABLE LOSS OF SIGNAL DETECT HARDWARE AND METHOD

(75) Inventors: James Stewart, Burlingame, CA (US); Anthony Ho, Sunnyvale, CA (US); Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 663 days.

(21) Appl. No.: 11/303,255

(22) Filed: Dec. 16, 2005

(65) Prior Publication Data

US 2006/0159460 A1 Jul. 20, 2006

Related U.S. Application Data

(60) Provisional application No. 60/640,352, filed on Dec. 30, 2004.

(51) Int. Cl.
  *H04B 10/00* (2006.01)
  *H04B 10/04* (2006.01)
  *H04B 10/08* (2006.01)

(52) U.S. Cl. .......................... 398/22; 398/33; 398/136; 398/137; 398/197

(58) Field of Classification Search .................. 398/15, 398/22, 37, 38, 94, 136, 137, 197, 33
See application file for complete search history.

(56) References Cited

U.S. PATENT DOCUMENTS 6,483,806 B1 * 11/2002 Flickinger et al. ........... 370/235
2002/0092972 A1 * 7/2002 Ames et al. .............. 250/214 A
2004/0022544 A1 2/2004 Case et al. .................. 398/137
2004/0136421 A1 * 7/2004 Robinson et al. ......... 372/38.02
2004/0151073 A1 8/2004 Preisach ..................... 368/110
2005/0025307 A1 * 2/2005 Xu et al. ..................... 379/398

FOREIGN PATENT DOCUMENTS

| JP | 05-83198 | 2/1993 |
| JP | 09-172409 | 6/1997 |
| JP | 2000-151290 | 5/2000 |
| JP | 2003-198475 | 7/2003 |
| WO | 2004/013991 | 2/2004 |

\* cited by examiner

*Primary Examiner*—Dalzid Singh
(74) *Attorney, Agent, or Firm*—Workman Nydegger (57) ABSTRACT

A loss of signal assert and de-assert level programming mechanism in an optical transceiver coupled to a host computing system. A control module is connected to the host so as to receive the programmable loss of signal level. A post-amplifier detects when the receive power drops below a loss of signal level. However, in this case, instead of the loss of signal level being static, a loss of signal level adjustment mechanism changes the loss of signal level detected by the post-amplifier as directed by the programmable loss of signal level received from the host. The loss of signal assert and de-assert levels may be calibrated by comparing receive power to the threshold for assertion and de-assertion of the loss of signal.

20 Claims, 4 Drawing Sheets

PROGRAMMABLE LOSS OF SIGNAL DETECT HARDWARE AND METHOD

CROSS-REFERENCE TO RELATED APPLICATIONS

This application claims the benefit of U.S. Provisional Application No. 60/640,352, filed Dec. 30, 2004, which is incorporated herein by reference in its entirety.

BACKGROUND OF THE INVENTION

1. The Field of the Invention

The present invention relates to high speed optical data transmission systems. More particularly, embodiments of the present invention relate to methods and hardware usable for adjusting assert and de-assert levels in a loss of signal detect circuit within an optical data transmission system.

2. The Relevant Technology

The ever-increasing demand for information communication technologies with faster transmission rates continues to drive the development of new equipment to be utilized with existing high speed data transmission networks. High speed data transmission networks often use optical transceivers and similar devices for transmitting and receiving light carrying digital data over optical fibers. These transceivers can include an optical transmitter, such as a laser, and an optical receiver, such as a photodiode. The transceiver often operates in communication with a host computing system ("host").

Occasionally, optical transceivers may experience a loss of signal condition in which the received optical power has dropped below levels expected for normal data communication. In order to detect this condition, many optical transceivers are equipped with loss of signal detect circuitry (sometimes referred to as a "signal detect circuitry"). Such a loss in signal in one node of the optical network may be due to, for example, an inoperable optical transmitter on the other node of the network. Also, the optical link between the two nodes may be obstructed or disconnected in some way. Furthermore, the ability of the optical receiver to receive data may have malfunctioned. When a loss of signal occurs, it is important for the associated host (or internally circuitry within the optical transceiver) to be made aware of the loss in signal, since normal operation cannot continue.

Conventional optical transceivers have static loss of signal detect levels which are dependent upon the components set during manufacturing. However, different optical transceivers may have slightly different operational properties in the coupling optics, trans-impedance amplifier and/or photodiode. This slight variation between optical transceivers means that this fixed signal detect level may be detected at different optical receive power levels.

Furthermore, a desirable loss of signal detect level may be different depending on the particular application or communication protocol that the optical transceiver is engaged with. For example, if the communication protocol uses forward error correction, then a lower signal detect level may be tolerable in order to gain the same bit error rate that would be obtainable at higher signal detect levels without forward error correction. Lower bit rate communication protocols may also permit lower signal detect levels, as compared to higher data rate applications.

Accordingly, it would be advantageous to have an optical transceiver loss of signal detector that can be programmed to operate with programmable loss of signal assert levels, which can be changed, set, and/or calibrated depending on the intended use and sensitivity needs existing at the time.

BRIEF SUMMARY OF THE INVENTION

In general, embodiments of the present invention relate to hardware and methods usable for programming a loss of signal level within an optical data communication system. Accordingly, an optical transceiver loss of signal detector with a changeable loss of signal assert level that can be programmed, set, and/or calibrated to different levels is described.

In an example embodiment of the present invention, a programmable loss of signal detector is included within an optical transceiver configured to be communicatively coupled to a host computing system ("host") at a receiver node within a data communication network. The loss of signal detector includes transceiver components such as a post-amplifier, a control module, and a loss of signal level adjustment mechanism.

In one aspect, the control module is connected to the host so as to be capable of receiving a programmable loss of signal level, where the loss of signal level can be a loss of signal assert level or a loss of signal de-assert level. A post-amplifier detects when the receive power passes a threshold loss of signal level, where the threshold loss of signal level can be one of a loss of signal assert level and a loss of signal de-assert level. However, in this case, instead of the loss of signal level being static, a loss of signal level adjustment mechanism changes the loss of signal level detected by the post-amplifier as directed by the programmable loss of signal level received from the host. Accordingly, the transceiver may dynamically adjust the loss of signal level as directed by the connected host.

In another embodiment of the present invention, methods for calibrating a loss of signal assert level can be implemented in an optical transceiver that includes a photodiode, a post-amplifier, and a control module. When an optical signal is provided into the photodiode, the optical signal has an initial receive power greater than the loss of signal level. The receive power of the optical signal is then decreased until the optical transceiver asserts a loss of signal. During the period where the receive power is being decreased, the receive power is monitored. After the optical transceiver asserts a loss of signal, a decision of whether the loss of signal level is to change is made. This decision may be based on a threshold receive power measured at approximately the time that the optical transceiver asserts the loss of signal. If it is determined that the loss of signal level is to change, the control module is instructed to adjust the loss of signal level.

Embodiments of the present invention can also include programmable loss of signal de-assert levels. For example, the control module initially implements a first loss of signal de-assert level, and then implements additional loss of signal de-assert levels when programmable loss of signal de-assert levels are received from the host. Also, the post-amplifier is configured to detect when a receive power rises above the programmable de-assert level, and terminates the loss of the signal. Additionally, the loss of signal level adjustment mechanism is configured to change or adjust the loss of signal de-assert level in response to the programmable de-assert levels received by the control module.

These and other embodiments of the present invention will become more fully apparent from the following description and appended claims.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EMBODIMENTS OF THE INVENTION

In general, embodiments of the present invention relate to programmable loss of signal assert levels in an optical transceiver coupled to a host computing system (hereinafter also referred to simply as a "host"). A control module communicates with the host so as to receive the programmable loss of signal level. A post-amplifier or other signal detect circuit detects when the receive power drops below a loss of signal level. However, in this case, instead of the loss of signal level being static, a loss of signal level adjustment mechanism changes the loss of signal level detected by the post-amplifier as directed by the programmable loss of signal level received from the host. The principles of the present invention also relate to the calibration of the loss of signal assert levels.

I. Loss of Signal Operating Environment

Figure 1:
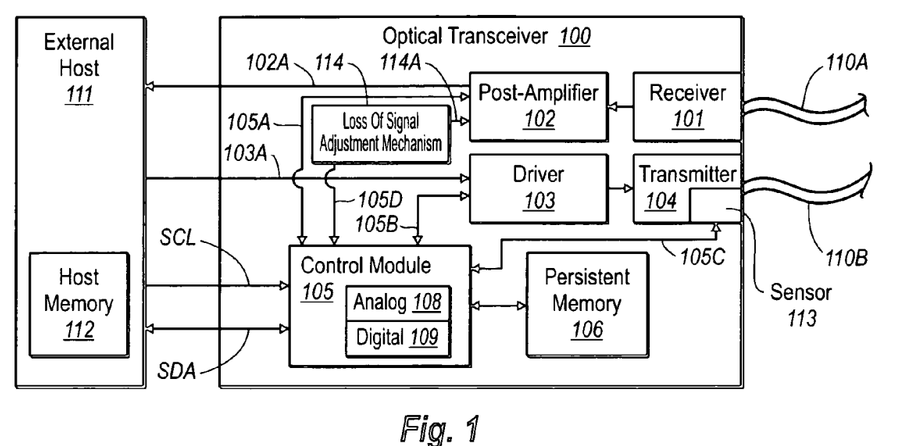
FIG. 1 illustrates a schematic diagram of an optical transceiver.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 10G and higher bandwidth fiber optic links. Furthermore, the principles of the present invention may be implemented in optical (e.g., laser) transmitter/receivers of any form factor such as XFP, SFP and SFF, without restriction.

The optical transceiver 100 receives an optical signal from fiber 110A using receiver 101. The receiver 101 acts as an opto-electric transducer by transforming the optical signal into an electrical signal. For example, the receiver 101 may be a photodiode. The receiver 101 provides the resulting electrical signal to a post-amplifier 102. The post amplifier 102 in combination with the control module 105 and the signal adjustment mechanism 114 constitute a loss of signal detector that collectively detect when the receive power of the optical signal is above (or below) a set level. The post-amplifier 102 is either connected to a loss of signal adjustment mechanism 114, as represented by 114A or may be integrated with the post-amplifier 102. Optionally, the electrical signal output from the photodiode can be processed through a transimpedance amplifier (not shown) before being routed to the post-amplifier 102. However, the transimpedance amplifier is not required and/or it can be integrated within the photodiode. The loss of signal detector asserts a loss of signal when the receive power falls below a programmable loss of signal level, and de-asserts when the receive power rises above a programmable loss of signal de-assert level.

When the loss of signal is not asserted, the post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Although the principles of the present invention mainly relate to the receive path just described, the transmit path of the optical transceiver 100 will also be described for the sake of completeness. Specifically, the laser driver 103 receives the electrical signal as represented by the arrow 103A, and drives the transmitter 104 (e.g., a laser or Light Emitting Diode ("LED")) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, receive power fluctuations, and feedback conditions may each affect the performance of these components. Accordingly, the optical transceiver 100 includes a control module 105, which may evaluate the receive power and transmit power, and obtain information from the post-amplifier 102 (as represented by arrow 105A) and from the laser driver 103 (as represented by arrow 105B). This allows the control module 105 to optimize the dynamically varying performance, and additionally detect when the receive power drops below a programmable loss of signal assert level by obtaining information from the loss of signal detector 114 (as represented by arrow 105D).

Specifically, the control module 105 may counteract these changes by adjusting settings on the post-amplifier 102 and/or the laser driver 103 as also represented by the arrows 105A, 105B. These settings adjustments are quite intermittent since they are only made when temperature or voltage or other low frequency changes so warrant. An example of such low frequency changes are the assertion and de-assertion of the loss of signal level due to slowly fluctuating receive power levels. In accordance with the principles of the present invention, settings of the receive power at which the loss of signal detector 114 asserts or de-asserts a loss of signal can be programmed and changed by the control module 105 as represented by arrow 105D.

The control module 105 may have access to a persistent memory 106, which can be a read-only memory ("ROM"), programmable read-only memory ("PROM"), erasable and programmable read-only memory ("EPROM") and/or electrically erasable and programmable read-only memory ("EEPROM"). Persistent memory 106 may also be any other non-volatile memory source.

Data and clock signals may be provided from the host 111 to the control module 105 using any host interface, although if the interface is I2C, the two-wire interface would include the serial clock line ("SCL"), and the serial data line ("SDA"). Also data may be provided from the control module 105 to the host 111 using serial data line SDA to allow for digital diagnostics and readings of temperature levels, transmit and/or receive power levels, and the like.

Figure 2:
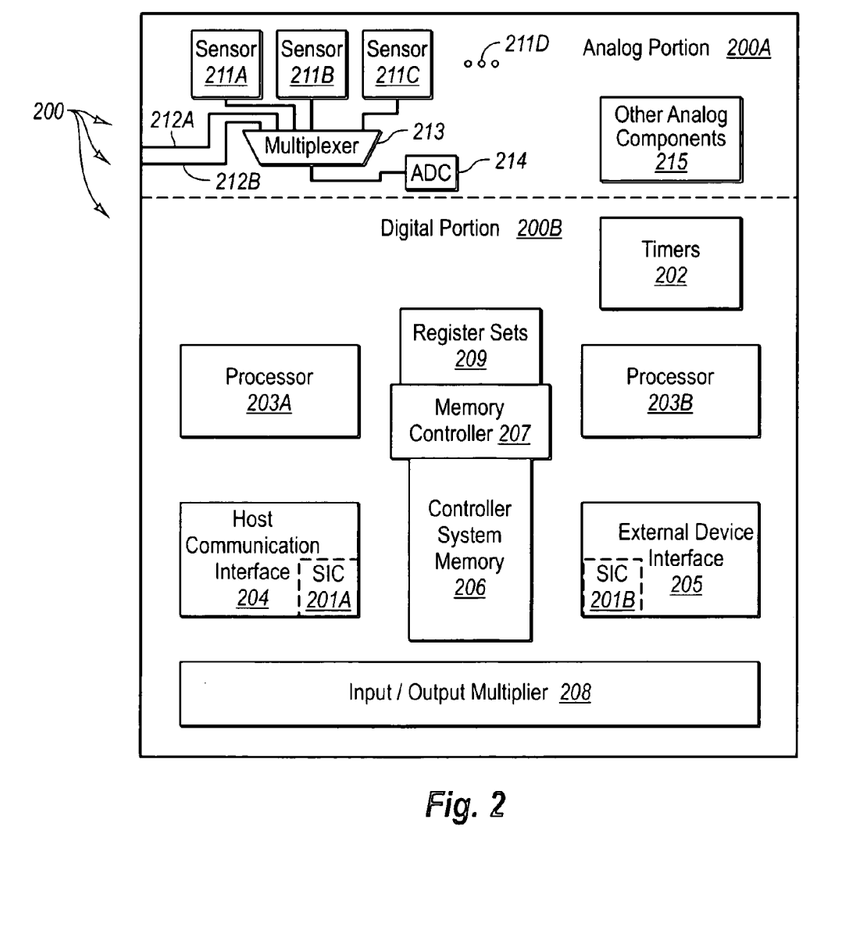
FIG. 2 illustrates a schematic diagram of a control module for an optical receiver.

The control module 105 includes both an analog portion 108 and a digital portion 109. Together, they allow the control module 105 to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

The analog portion 200A may contain digital to analog converters, analog to digital converters, high speed comparators (e.g., for event detection), voltage based reset generators, voltage regulators, voltage references, clock generator, and other analog components. The analog portion 200A can include sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module 200 may also receive external analog or digital signals from other components within the optical transceiver that indicate other measured parameters such as, for example, laser bias current, transmit power, and receive power. Two external lines 212A, 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own analog to digital converter ("ADC"). However, to preserve chip space, each signal may be periodically sampled in a round robin fashion using a single ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

The digital portion 200B of the control module 200 may include a timer module 202 that provides various timing signals used by the digital portion 200B. Such timing signals may include, for example, programmable processor clock signals. Also, two general-purpose processors 203A, 203B are included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A, 203B are each a 16-bit processor and may be identically structured. The precise structure of the hardware environment and instruction set is not important to the principles of the present invention as the instruction set may be optimized around a particular hardware environment.

A host communications interface 204 is used to communicate with the host 111 using the serial data ("SDA") and serial clock ("SCL") lines of the optical transceiver 100. The external device interface 205 is used to communicate with other modules within the optical transceiver 100 such as the post-amplifier 102, the laser driver 103, the persistent memory 106, or the loss of signal detector 114.

The internal controller system memory 206 (not to be confused with the external persistent memory 106) may be random access memory ("RAM") or non-volatile memory. The memory controller 207 shares access to the controller system memory 206 amongst each of the processors 203A, 203B and with the host communication interface 204 and the external device interface 205. In one embodiment, the host communication interface 204 includes a serial interface controller 201A, and the external device interface 205 includes a serial interface controller 201B. The two serial interface controllers 201A, 201B may communicate using a two-wire a interface such as I²C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

The control module 105 can also include register sets 209 that contain a number of individual registers. These registers may be used to record digital values representing sensed operational parameters as received from the ADC 214. An example of such values may include, for example, optical receive power. The register sets 209 may also be used to store programmable loss of signal assert levels and de-assert levels. In one instance, the host 111 communicates the programmable loss of signal assert level and the programmable loss of signal de-assert level to the control module 105 using the clock line SCL and the data line SDA and following the I²C two wire interface. The control module 105 may then provide the programmable loss of signal assert and de-assert levels into the register sets 209.

Additionally, one or more of the register sets 209 may be memory mapped to the post-amplifier 102, the driver 103, or the loss of signal adjustment mechanism 114 such that the values within the memory mapped registers actually affects operation of these components. Specifically, a processor 203A, 203B may write digital values to, or receive digital values from, a corresponding memory mapped register. The digital value can then be converted into an analog value for controlling functionality of the corresponding memory mapped component. For example, the host may transfer a loss of signal assert level and a de-assert level into the register set, which can then be provided to the loss of signal adjustment mechanism for adjusting the receive power level at which the loss of signal asserts and de-asserts.

With continuing reference to FIGS. 1 and 2, the host 111 includes a host memory 112 which may be capable of storing microcode. For example, the host memory 112 may contain a library of different microcode that each implements transceiver operational functions. This library of different microcode may have been accessed from a remote network site or programmed into the host by a user, although this is not required. The host 111 may send the microcode to the transceiver control module 105 over the SDA and SCL lines. The microcode may be received into the controller system memory 206 for immediate execution. The microcode may also be received into the register sets 209 or persistent memory 106 and later loaded into controller system memory 206 for execution.

The host 111 may send the microcode in response to changing operational circumstances in transceiver 100 or to cause the control module 105 to change the receive power level at which the transceiver asserts and de-asserts a loss of signal. Alternatively, the microcode itself may be configured to cause the control module 105 to determine that the loss of signal assert and/or de-assert level should be changed autonomously from the host. For example, transceiver 100 may contain microcode that is used to initialize transceiver operational functions at the time transceiver 100 begins operation. This microcode, when executed, determines the initial values of a receive power loss of signal assert level and loss of signal de-assert level detected by the loss of signal detector 114.

When the control module 105 executes the microcode, the processors 203A, 203B load the microcode into the controller system memory 206. Alternatively, the processors 203A, 203B may load microcode stored in persistent memory 106 or register sets 209 into controller system memory 206. The processors 203A, 203B execute the microcode, causing the microcode to change the operational performance of transceiver 100. For example, the processors 203A and 203B may write the new loss of signal assert and de-assert levels to the register sets 209, thereby controlling the operation of the loss of signal detector 114.

Having described operational environments with respect to FIGS. 1 and 2, it will be understood that the environments are only some of countless architectures in which the principles of the present invention may be employed. As previously stated, the principles of the present invention are not intended to be limited to any particular environment. Accordingly, the principles of the present invention relate to an optical transceiver capable of communicating with the host computing system to change programmable loss of signal assert levels and de-assert levels. The principles of the present invention will be discussed with reference to the environment described in relation to FIGS. 1 and 2.

II. Loss of Signal Detectors

Figure 3:
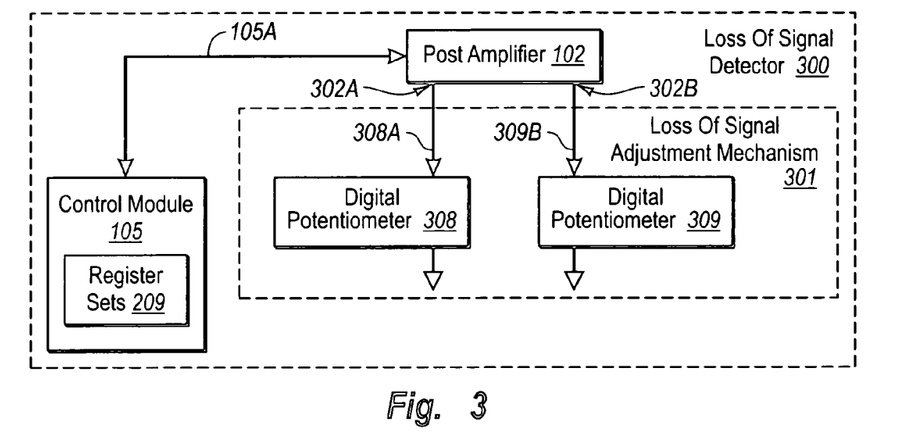
FIG. 3 illustrates a schematic diagram of an embodiment of a transceiver having a loss of signal detector.
Figure 4:
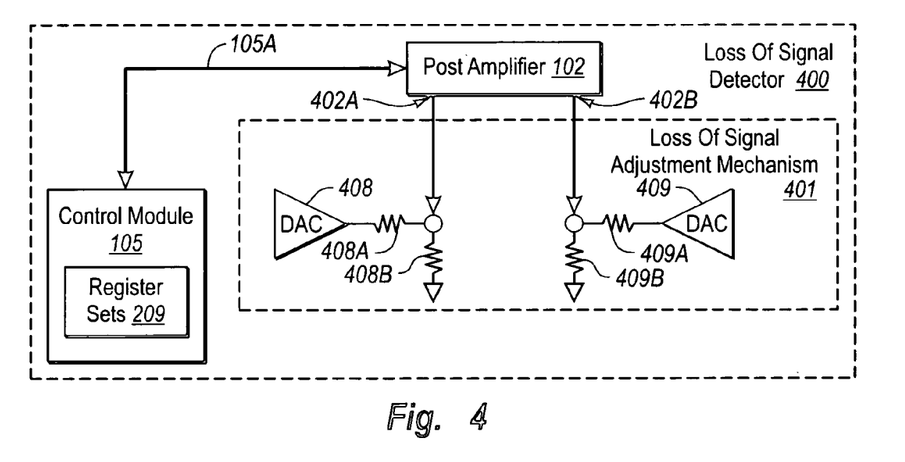
FIG. 4 illustrates a schematic diagram of an embodiment of a transceiver having a loss of signal detector.
Figure 5:
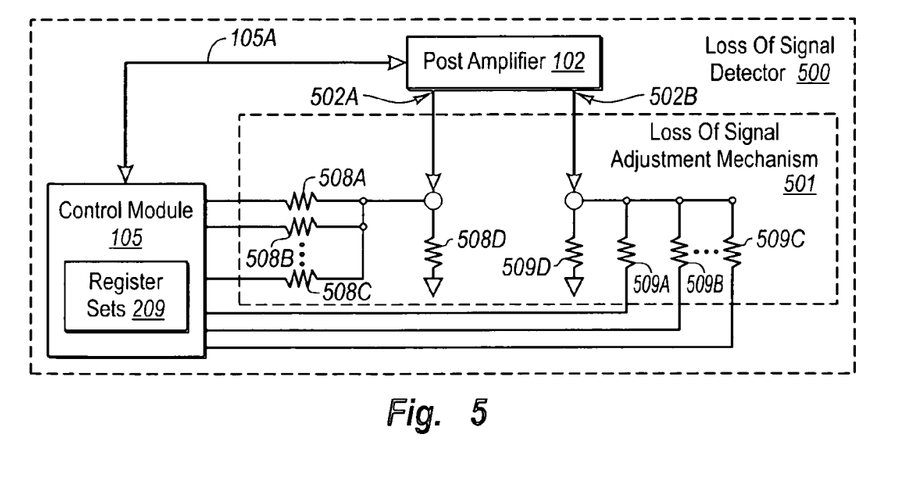
FIG. 5 illustrates a schematic diagram of an embodiment of a transceiver having a loss of signal detector.

FIGS. 3-5 illustrate various embodiments 300, 400 and 500, respectively, of a loss of signal detector detecting when a received optical signal has insufficient power. In each case, the loss of signal detector includes a post-amplifier 102 and a control module 105 originally illustrated in FIG. 1. The post-amplifier 102 is configured to detect when a receive power passes a threshold loss of signal level, which is where the receive power drops below the loss of signal assert level or rises above the loss of signal de-assert level. Furthermore, the loss of signal detectors include a loss of signal adjustment mechanism, which represent different embodiments of the loss of signal adjustment mechanism 114 of FIG. 1. For example, The loss of signal detectors 300, 400 and 500 include respective loss of signal adjustment mechanisms 301, 401, and 501.

The loss of signal detectors of FIGS. 3 through 5 are operable within the optical transceiver 100 at a receiving node in an optical network as shown in FIG. 1. Accordingly, the loss of signal detectors can determine when the optical signal being received is lost, or has a receive power low enough that the data may be compromised. In an optical communication system, a transmitter in a transmitting node that is sending digital data through an optical system may become inoperable or compromised in a manner than results in no signal or an inadequate signal at a receiving node. When this happens, it is important for the receiving node to recognize that the data signal may be corrupted or incomplete so that the host can determine whether to utilize or ignore the data, perform diagnostics, and/or whether to perform some remedial action.

With continuing reference to FIGS. 3-5, the loss of signal detectors 300, 400 and 500 each include the post-amplifier 102 in communication with the control module 105 as shown by the arrow 105A. The control module 105 is further in communication with the correspond loss of signal adjustment mechanisms 301, 401, and 501 so as to control the amount of current drawn from the post-amplifier output nodes. For example, by changing the amount of current drawn from node 302A of the post-amplifier 102 of FIG. 3, the loss of signal assert level may be altered. By changing the amount of current drawn from node 302B of the post-amplifier 102 of FIG. 3, the loss of signal de-assert level may be altered. Similarly, by changing the current drawn from nodes 402A and 402B of the post-amplifier 102 of FIG. 4, the loss of signal assert and de-assert levels may be altered. Finally, by changing the current drawn from nodes 502A and 502B of the post-amplifier 102 of FIG. 5, the loss of signal assert and de-assert levels may be altered. Note the post-amplifier 102 may have different loss of signal assert and de-assert levels.

Since the magnitude of the current drawn from the post-amplifier 102 can determine the loss of signal assert level and de-assert level, specific magnitudes of current can correspond to specific loss of signal assert and de-assert levels. Optionally, another component can be substituted for the post-amplifier 102 in the loss of signal detector 114, in order to have the magnitude of the current drawn from the component correspond with the loss of signal assert and de-assert levels.

In each case of FIGS. 3 through 5, the structure of the corresponding loss of signal adjustment mechanism allows the control module 105 to control the amount of current that the loss of signal adjustment mechanism draws from the post-amplifier 102, which in turn controls the loss of signal assert and de-assert levels. In accordance with the principles of the present invention, the control module 105 receives a programmable loss of signal assert or de-assert level from the host. The programmable loss of signal assert and de-assert levels can be recorded and stored as data in memory mapped address locations within the register sets 209. Through such memory mapping, the control module 105 can send instructions to the respective loss of signal adjustment mechanism to thereby change the loss of signal assert and de-assert levels.

In one embodiment of the present invention illustrated in FIG. 3, a loss of signal detector 300 includes a loss of signal adjustment mechanism 301 that has two digital potentiometers 308 and 309. The digital potentiometers 308, 309 are configured to have their settings adjusted in response to digital instructions, where a change in setting changes the resistance across the digital potentiometers 308, 309. The digital instructions are provided by the control module 105 through, for example, memory mapping with one or more address locations within the register sets 209. By changing the potential provided by the digital potentiometer 308, the current drawn from node 302A (and hence the loss of signal assert level) may be altered. By changing the potential provided by the digital potentiometer 309, the current drawn from node 302B (and hence the loss of signal de-assert level) may be altered. Accordingly, the control module 105 can instruct the digital potentiometers 308, 309, either independently or in combination, to change the loss of signal assert and de-assert levels in response to instructions to change such levels received from the host. In alternative embodiments, the loss of signal adjustment mechanism can include only one digital potentiometer, or a plurality of digital potentiometers.

FIG. 4 illustrates another embodiment of a loss of signal detector 400, which includes a loss of signal adjustment mechanism 401 having two digital-to-analog converters ("DAC") 408 and 409. The control module 105 is capable of sending a digital value to each DAC 408, 409 through, for example, memory mapping with one or more address locations within the register sets 209. By controlling the digital value sent to each DAC 408, 409, the corresponding analog output can be controlled. As such, the voltage applied to the resistors 408A, 409A from each DAC 408, 409 can vary in accordance with the digital value received. When the voltage applied to the resistor 408A is changed, the current drawn from node 402A of the post-amplifier 102 through the resistor 408B (and hence the loss of signal assert level) may be altered. Correspondingly, a change in the voltage applied to the resistor 409A alters the current drawn from node 402B of the post-amplifier 102 through the resistor 409B (and hence alters the loss of signal de-assert level). Accordingly, the control module 105 can change the digital signal supplied to the DACs 408, 409, either independently or in combination, to adjust the loss of signal assert and de-assert levels. Alternatively, the loss of signal adjustment mechanism 401 can include only one DAC, or a plurality of DACs.

Referring now to FIG. 5, which illustrates another embodiment of a loss of signal detector 500 that includes a loss of signal adjustment mechanism 501. The loss of signal adjustment mechanism 501 can include a bank of parallel resistors 508A, 508B, 508C (the bank of parallel resistors hereinafter referred to as "508") in a circuit configured for adjusting the current drawn from node 502A of the post-amplifier 102 through the resistor 508D. Additionally, the loss of signal adjustment mechanism 501 can include a bank of parallel resistors, 509A, 509B, 509C (the bank of parallel resistors hereinafter referred to as "509") in a circuit for adjusting the current drawn from node 502B of the post-amplifier 102 through the resistor 509D. Changing the voltage applied to any of the resistors changes the current across those resistors as well as the current drawn from the nodes 502A, 502B of the post-amplifier. As such, the control module 105 is configured to alter the voltage applied to any of the resistors within the bank of parallel resistors 508 to change loss of signal assert level. Correspondingly, the control module 105 is configured to alter the voltage applied to any of the resistors within the bank of parallel resistors 509 to change the loss of signal de-assert level. Additionally, it should be recognized that the control module 105 can alter the voltage by applying no voltage, or changing the magnitude of the voltage applied to either bank of parallel resistors 508, 509.

While embodiments of the invention have been described that include a digital potentiometer, digital to analog converter, or a bank of parallel resistors, it should be recognized that each embodiment adjusts the current drawn from the nodes of the post-amplifier. As such, one embodiment of a loss of signal adjustment mechanism can include at least one component selected from the group consisting of a digital potentiometer, a digital to analog converter, or a plurality of resistors. Also, other components that can be controlled by the control module, which dynamically alters the current drawn from the nodes of the post-amplifier can be integrated into the loss of signal adjustment mechanism for use in programming the loss of signal assert and de-assert levels.

III. Loss of Signal Operational Procedure

Figure 6A:
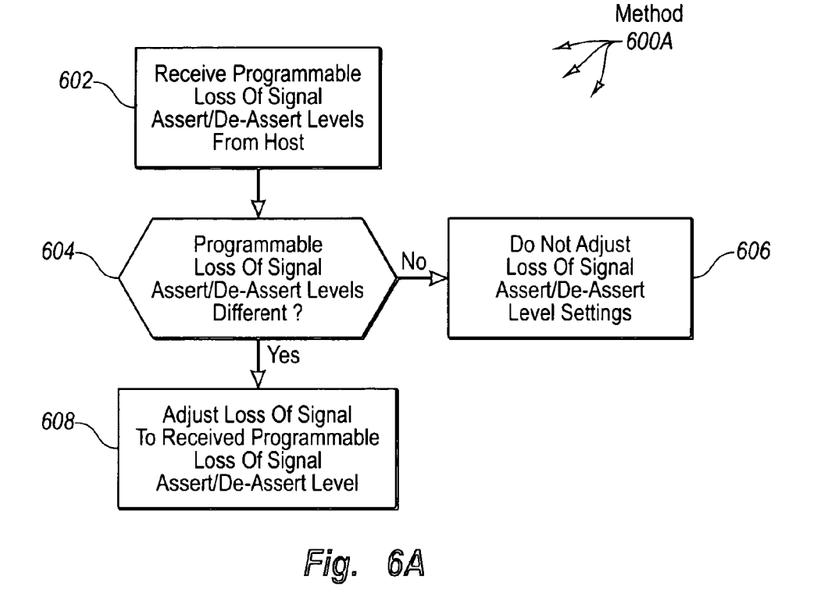
FIG. 6A illustrates a flow chart for an embodiment of a method for adjusting a loss of signal assert and/or de-assert levels in response to a host instruction.

FIG. 6A illustrates another embodiment of the present invention that provides a method 600A for an optical transceiver to adjust a loss of signal assert and/or de-assert level. The operating environment of the transceiver can include the optical transceiver communicatively coupled to a host computing system ("host") at a receiver node within a data communication network. The operating environment of FIG. 1, control module architecture of FIG. 2, and loss of signal detector embodiments illustrated in FIGS. 3-5 can be utilized during processing through the method 600A.

The method 600A includes the optical transceiver receiving a programmable loss of signal assert and/or de-assert level from the host computing system at stage 602. Accordingly, the host transfers a programmable loss of signal assert and/or de-assert level to the transceiver, which can be received by the control module. This can allow for the host to be programmed with data and/or code to dynamically vary the loss of signal assert and/or de-assert level, and to send corresponding loss or signal assert and/or de-assert data to the corresponding components, namely the control module, while the transceiver is operating and receiving optical data signals. In one embodiment the control module stores the programmable loss of signal assert and/or de-assert level in a register set. In another embodiment, the register sets are memory mapped to components in the loss of signal detector, or loss of signal adjustment mechanism so that the programmable loss of signal assert and/or de-assert level can be transferred as needed.

After the transceiver has received the programmable loss of signal assert and/or de-assert level, processing will be different depending on whether or not the programmable loss of signal level is the same as or different than the prior loss of signal assert and/or de-assert level (decision block 604). At stage 606, if the received programmable loss of signal assert and/or de-assert level is the same as the currently implemented loss of signal assert and/or de-assert level (No in decision block 604), the transceiver does not adjust the loss of signal assert and/or de-assert level. On the other hand (Yes in decision block 604), a different programmable loss of signal assert and/or de-assert level results in the transceiver adjusting the loss of signal assert and/or de-assert level to the received programmable loss of signal assert and/or de-assert level at stage 608. The process of adjusting the loss of signal assert and/or de-assert level can be performed by a loss of signal adjustment mechanism, and/or any corresponding component or subcomponent described herein or equivalent in the art.

In one embodiment of the present invention, changing a setting or the potential of at least one digital potentiometer adjusts the loss of signal assert and/or de-assert level. In another embodiment, changing a voltage output of at least one digital-to-analog converter adjusts the loss of signal assert and/or de-assert level. In yet another embodiment, selectively changing the voltage applied to at least one resistor in a bank of parallel resistors with a post-amplifier adjusts the loss of signal assert and/or de-assert level. Alternatively, any means capable of dynamically changing the current drawn from the post-amplifier, or specifically from the nodes of the post-amplifier, can be implemented with the loss of signal adjustment mechanism in order to adjust the loss of signal assert and/or de-assert levels.

Figure 6B:
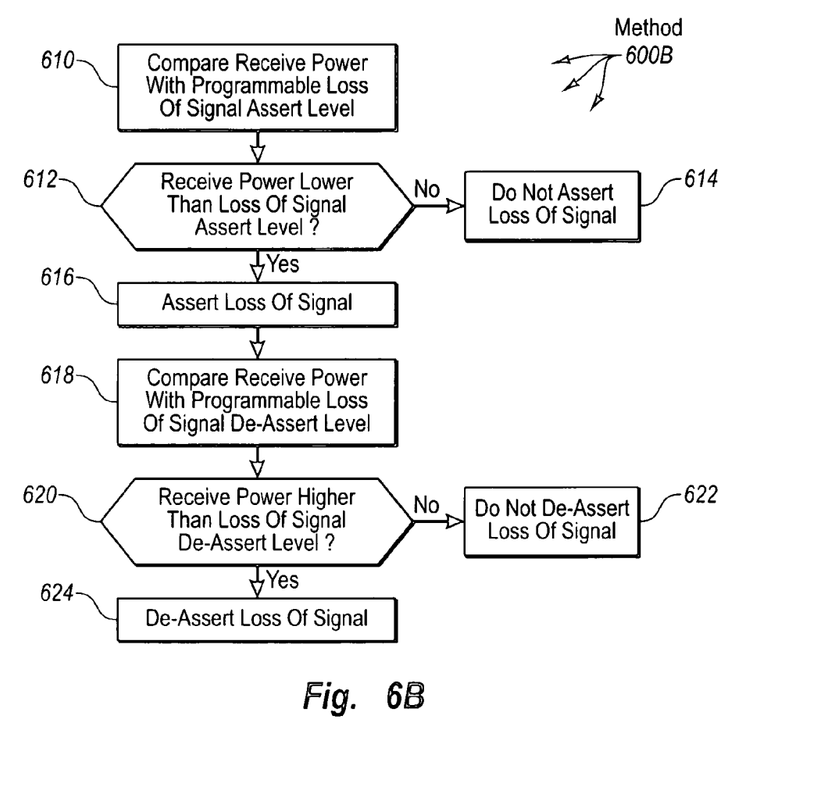
FIG. 6B illustrates a flow chart of a method for asserting or de-asserting a loss of signal using the assert and de-assert levels.

FIG. 6B illustrates another embodiment of the present invention that provides a method 600B for asserting a loss of signal and/or de-asserting a loss of signal. The operating environment for the method 600B can be substantially the same as the operating environment described in method 600A. Accordingly, the method 600B includes the optical transceiver, or more particularly, the post-amplifier continuously comparing the receive power with the programmable loss of signal level at stage 610. As such, the receive power can be processed through the post-amplifier, in order to recognize when the receive power crosses certain threshold values. When the receive power is not lower than the programmable loss of signal level (No in decision block 612), the transceiver does not need to assert a loss of signal (stage 614), and the transceiver can continue receiving optical data and transferring the data to the host.

At some point it is likely that the receive power will eventually become too low to accurately carry data, or it may fall below a threshold level (Yes in decision block 612). At stage 616, the transceiver detects a loss of signal in response to a received power level falling below the programmable loss of signal level and asserts a loss of signal. The detection can be performed by a post-amplifier or from signals sent from the post-amplifier to the control module, and may be performed on a periodic and/or continuous basis. In one embodiment, the transceiver can assert a loss of signal alarm. In another embodiment, a loss of signal notification can be sent to the host so that the received data is quarantined and/or tagged as being unreliable. Also, when the loss of signal is asserted, the transceiver and/or host can implement a procedure to increase the receive power. Such a procedure can include transmitting diagnostic data to the data signal transmission source so that the transmission power and the corresponding receive power can be increased to an acceptable level.

While the transceiver is operational and after a loss of signal has been asserted, at stage 618 the optical transceiver continuously or periodically compares the receive power with the loss of signal de-assert level. After the receive power begins to increase, the receive power will still be below the loss of signal de-assert level (No to decision block 620) and the loss of signal should not be de-asserted at stage 622. However, when the receive power increases above the loss of signal de-assert level (Yes to decision block 620), the loss of signal is de-asserted at stage 624. After the loss of signal is de-asserted, the optical transceiver continues comparing the receive power with the programmable loss of signal level (return to stage 610) until a new programmable loss of signal is received into the transceiver.

Figure 7:
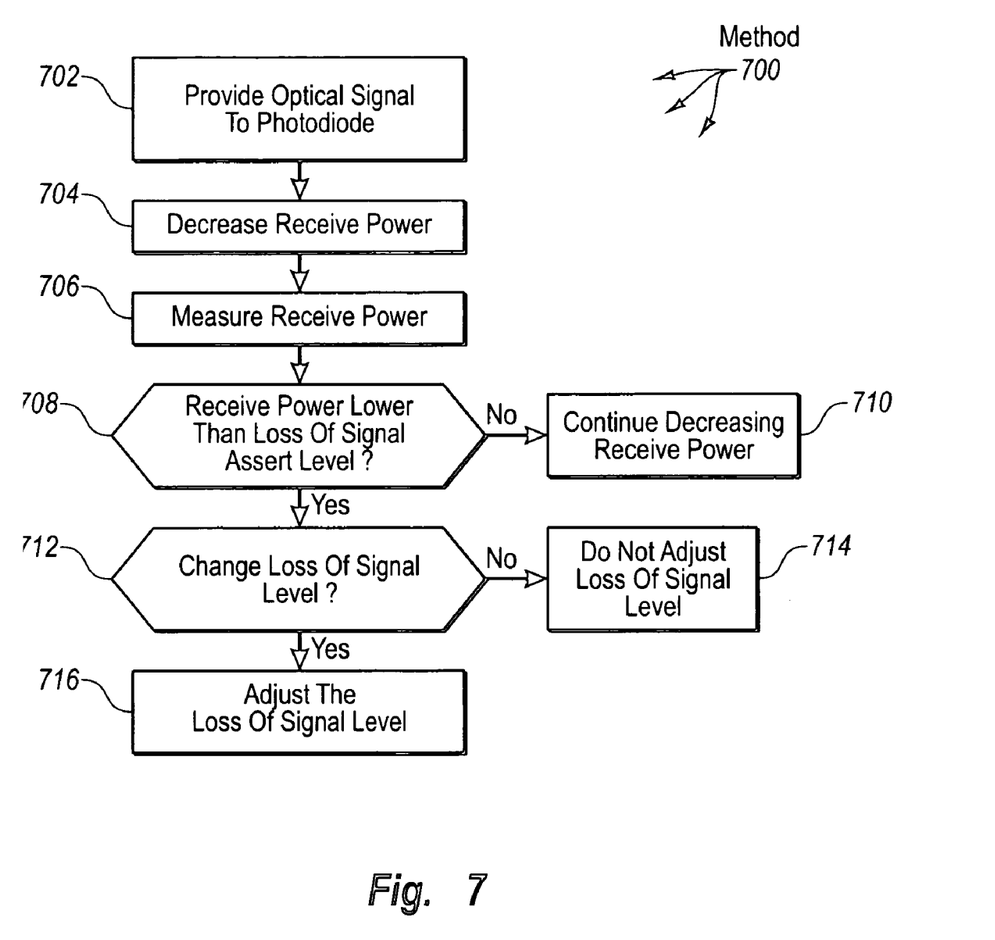
FIG. 7 illustrates a flow chart for an embodiment of a method for calibrating a loss of signal levels.

FIG. 7 illustrates another embodiment of a method 700 for calibrating the loss of signal assert and/or de-assert level. The method 700 can be implemented in an operating environment substantially similar with methods 600A and 600B. The method 700 can be initiated by providing an optical signal into a receiver, or more particularly into a photodiode at stage 702. The optical signal should have a receive power that is above the initial loss of signal assert level because it may be difficult to calibrate the loss of signal assert level while the loss of signal is being asserted. However, a receive power that is lower than the loss of signal assert level can be increased until the loss of signal assert level is no longer asserted before implementation of stage 702.

After the receive power is higher than the loss of signal assert level and the loss of signal is not being asserted, the receive power of the optical signal is decreased at stage 704. Concurrently, the receive power is continually measured at stage 706 during the period when the receive power is being decreased. Alternatively, the receive power can be measured at discrete intervals while the receive power is being decreased. As long as the receive power is higher than the loss of signal assert level (No in decision block 708), the power can continue to be decreased and measured at stage 710. Monitoring and measured the receive power can aid in identifying the receive power level where the loss of signal actually asserts.

When the receive power level at which the loss of signal asserts is identified (Yes in decision block 708), the actual assertion level is compared to a threshold receive power programmed or set by the optical transceiver at stage 712. As such, a decision of whether to change the actual receive power where the loss of signal asserts is based on the threshold receive power measured at approximately the time that the optical transceiver asserts the loss of signal. If the actual assertion level is the same as the threshold receive power (No in decision block 712), the loss of signal level does not need to be calibrated or adjusted at stage 714. However, if the actual assertion level is either higher or lower than the programmed threshold receive power (Yes in decision block 712), the loss of signal level is adjusted at stage 716.

The loss of signal de-assert level can also be calibrated in a similar manner. In order to calibrate the loss of signal de-assert level, the receive power should be decreased until it is below the loss of signal assert level so that the optical transceiver asserts a loss of signal. The receive power is then increased until the optical transceiver de-asserts a loss of signal. While the receive power is being increased, the receive power is constantly measured so that when the loss of signal de-asserts the actual receive power can be compared to a de-assertion threshold receive power that has been programmed into the optical transceiver.

After the loss of signal de-asserts, a decision is made to determine whether the loss of signal de-assert level is to change based on the de-assertion threshold receive power measured at approximately the time that the optical transceiver de-asserts the loss of signal. An actual de-assertion level that is the same as the programmed threshold receive power does not need calibrating. However, when the actual de-assertion level is different from the threshold receive power; the de-assertion level should be calibrated. The control module is then instructed to adjust the loss of signal de-assert level, and the de-assertion level is adjusted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver configured to be communicatively coupled to a host computing system at a receiver node within a data communication network, a programmable loss of signal detector comprising:

a control module communicatively coupled to the host computing system so as to receive a programmable loss of signal level, the programmable loss of signal level received from the host specifying a particular receive power level below which a loss of signal is asserted and above which a loss of signal is not asserted;

a post-amplifier configured to detect when a receive power passes a stored loss of signal level; and a loss of signal level adjustment mechanism configured to change the stored loss of signal level detected by the post-amplifier in response to the programmable loss of signal level received by the control module.

2. A programmable loss of signal detector according to claim 1, wherein the control module includes a register set configured to receive and store the programmable loss of signal level.

3. A programmable loss of signal detector according to claim 2, wherein the register sets receive the programmable loss of signal level from the host computing system.

4. A programmable loss of signal detector according to claim 1, further comprising a photodiode communicatively coupled with the post-amplifier, the photodiode configured to receive an optical signal having the receive power.

5. A programmable loss of signal detector according to claim 1, wherein the loss of signal level adjustment mechanism includes at least one digital potentiometer.

6. A programmable loss of signal detector according to claim 5, wherein the at least one digital potentiometer is configured to change a current drawn from the post-amplifier in response to the programmable loss of signal level received by the control module, and wherein a change in the drawn current changes the programmable loss of signal level detected by the post-amplifier.

7. A programmable loss of signal detector according to claim 1, wherein the loss of signal level adjustment mechanism includes at least one digital-to-analog converter.

8. A programmable loss of signal detector according to claim 7, wherein the at least one digital-to-analog converter is configured to change a current drawn from the post-amplifier in response to the programmable loss of signal level received by the control module, and wherein a change in the current drawn changes the programmable loss of signal level detected by the post-amplifier.

9. A programmable loss of signal detector according to claim 1, wherein the loss of signal adjustment mechanism includes a bank of parallel resistors.

10. A programmable loss of signal detector according to claim 9, wherein the control module is configured to alter the amount of current flowing through at least one of the resistors in the bank of parallel resistors, wherein the altering of the current changes the programmable loss of signal level detected by the post-amplifier.

11. In an optical transceiver configured to be communicatively coupled to a host computing system at a receiver node within a data communication network, a method for the optical transceiver to adjust a stored loss of signal level comprising:
an act of receiving a programmable loss of signal assert level from the host computing system the programmable loss of signal assert level received from the host specifying a receive power level below which a loss of signal is asserted and above which a loss of signal is not asserted;
an act of adjusting a stored loss of signal assert level in response to the programmable loss of signal assert level; and
an act of detecting a loss of signal in response to a received power level falling below the programmable loss of signal assert level.

12. A method according to claim 11, further comprising:
an act of storing the programmable loss of signal asset level in a register set, the register set being part of the control module; and
loading the programmable loss of signal assert level from the host into a register set.

13. A method according to claim 11, wherein the act of adjusting includes one of a digital potentiometer, digital-to-analog converter, and a resistor in a bank of parallel resistors changing a current drawn from the post-amplifier.

14. A method according to claim 11, further comprising:
an act of receiving a programmable loss of signal de-assert level from the host computing system;
an act of adjusting a loss of signal de-assert level in response to the programmable loss of signal de-assert level; and
an act of terminating a loss of signal in response to the received power level rising above the programmable loss of signal de-assert level.

15. A method according to claim 11, further comprising:
an act of storing the programmable loss of signal asset level in a register set, the register set being part of the control module; and
loading the programmable loss of signal assert level from the host into a register set.

16. A method according to claim 14, wherein the act of adjusting a loss of signal de-assert level includes one of a digital potentiometer, digital-to-analog converter, and a resistor in a bank of parallel resistors changing a current drawn from the post-amplifier.

17. In an optical transceiver configured to be communicatively coupled to a host computing system at a receiver node within a data communication network, a method for calibrating a loss of signal assert level, comprising:
an act of providing an optical signal into the photodiode;
an act of decreasing a receive power of the optical signal until the optical transceiver asserts a loss of signal;
an act of measuring the receive power during the act of decreasing;
an act of determining that a loss of signal assert level is to change based on a threshold receive power measured at approximately the time that the optical transceiver asserts the loss of signal; and
in response to the act of determining, an act of instructing the control module to adjust the loss of signal assert level.

18. A method according to claim 17, further comprising:
an act of adjusting the loss of signal assert level.

19. A method according to claim 17, further including:
an act of increasing the receive power until the optical transceiver de-asserts a loss of signal;
an act of determining that a loss of signal de-assert level is to change based on a de-assertion threshold receive power measured at approximately the time that the optical transceiver de-asserts the loss of signal; and
in response to the act of determining that the loss of signal de-assert level is to change, an act of instructing the control module to adjust the loss of signal de-assert level.

20. A method according to claim 19, further comprising:
an act of adjusting the loss of signal de-assert level.

* * * * *

UNITED STATES PATENT AND TRADEMARK OFFICE
CERTIFICATE OF CORRECTION

| | |
|---|---|
| PATENT NO. | : 7,620,317 B2 |
| APPLICATION NO. | : 11/303255 |
| DATED | : November 17, 2009 |
| INVENTOR(S) | : Stewart et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Twenty-sixth Day of October, 2010

David J. Kappos
*Director of the United States Patent and Trademark Office*